United States Patent [19]

Aeschlimann et al.

[11] Patent Number: 6,007,586
[45] Date of Patent: Dec. 28, 1999

[54] PIGMENT DYEING AND PIGMENT PRINTING PROCESS

[75] Inventors: Peter Aeschlimann, Allschwil; Paul Herzig, Basel, both of Switzerland

[73] Assignee: Ciba Specialty Chemicals Corporation, Tarrytown, N.Y.

[21] Appl. No.: 09/100,001

[22] Filed: Jun. 17, 1998

[30] Foreign Application Priority Data

Jul. 4, 1997 [CH] Switzerland .............................. 1634/97

[51] Int. Cl.$^6$ ................................ D06P 1/44; D06P 1/02; D06P 1/14
[52] U.S. Cl. ..................... 8/466; 8/445; 8/541; 8/542; 8/696; 8/637.1; 8/685; 8/661; 8/662; 8/675
[58] Field of Search ........................ 8/637.1, 696, 541, 8/542, 685, 675, 445, 466, 661

[56] References Cited

U.S. PATENT DOCUMENTS

| | | | |
|---|---|---|---|
| 4,153,618 | 5/1979 | Desai | 260/345.2 |
| 4,376,729 | 3/1983 | Crounse | 260/197 |
| 4,379,088 | 4/1983 | Crounse | 260/157 |
| 4,379,089 | 4/1983 | Crounse | 260/161 |
| 4,412,950 | 11/1983 | Crounse | 260/157 |
| 4,448,722 | 5/1984 | Crounse | 260/245.1 |
| 4,536,570 | 8/1985 | Crounse | 534/819 |
| 5,352,729 | 10/1994 | Birkhofer et al. | 524/549 |

FOREIGN PATENT DOCUMENTS

88/02043 3/1988 WIPO .

*Primary Examiner*—Margaret Einsmann
*Attorney, Agent, or Firm*—Kevin T. Mansfield; David R. Crichton

[57] ABSTRACT

The present invention describes a process for dyeing or printing fiber material by the pigment dyeing or pigment printing process, which comprises applying to the fiber material, and subsequently fixing, a dyeing liquor or a print paste comprising at least one dye of the formula $$D\text{—}(X)_n \qquad (1)$$

in which

D is a radical of an insoluble organic dye of the phthalocyanine, perinone, indigoid, thioindigoid, dioxazine, diketopyrrolopyrrole, isoindolinone, perylene, quinacridone, metal complex, monoazo, disazo, trisazo or anthraquinone series, X is a hydrophilic polar radical, and n is 1, 2 or 3, and at least one pigment dye binder, and also, if desired, further auxiliaries.

14 Claims, No Drawings

PIGMENT DYEING AND PIGMENT PRINTING PROCESS

The present invention relates to a process for dyeing or printing fibre material with specific dyes by the pigment dyeing or pigment printing process.

The dyeing or printing of fibre materials by the pigment printing or pigment dyeing process is among those processes which have long been known. The pigment dyes employed in these processes, however, are often not able to fully meet the requirements which are set nowadays in respect, in particular, of sublimation fastness and dry-cleaning fastness properties.

It has now been found that with the novel process described below a significant improvement is surprisingly achieved in the sublimation fastness and dry-cleaning fastness of pigment prints and pigment dyeings, and that it is hence possible to make a contribution to the required improvement of these printing or dyeing processes.

The present invention therefore provides a process for dyeing or printing fibre material by the pigment dyeing or pigment printing process, which comprises applying to the fibre material, and subsequently fixing, a dyeing liquor or a print paste comprising at least one dye of the formula

   (1)

in which

D is a radical of an insoluble organic dye of the phthalocyanine, perinone, indigoid, thioindigoid, dioxazine, diketopyrrolopyrrole, isoindolinone, perylene, quinacridone, metal complex, monoazo, disazo, trisazo or anthraquinone series, X is a hydrophilic polar radical, and n is 1, 2 or 3, and at least one pigment dye binder, and also, if desired, further auxiliaries.

The fibre material is preferably printed by the pigment printing process with a print paste comprising at least one dye of the formula (1) and at least one pigment dye binder and, if desired, further auxiliaries, and subsequently fixed. D is preferably a radical of an insoluble organic dye of the monoazo, disazo, trisazo or anthraquinone series.

By insoluble organic dye is meant preferably a water-insoluble organic dye. In the process of the invention preference is given to dyes of the formulae

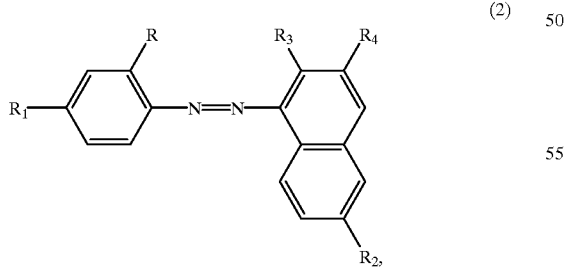   (2)

in which

R is hydrogen, halogen, nitro or cyano, $R_1$ is hydrogen, halogen, nitro, cyano or a radical X, $R_2$ is hydrogen or a radical X, $R_3$ is amino or hydroxyl, $R_4$ is hydrogen or a radical of the formula

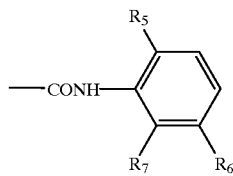

in which $R_5$ is hydrogen, $C_1$–$C_4$alkyl or $C_1$–$C_4$alkoxy, $R_6$ is hydrogen or halogen, and $R_7$ is hydrogen, $C_1$–$C_4$alkyl or $C_1$–$C_4$-alkoxy, the dye of the formula (2) being required to contain at least one radical X,

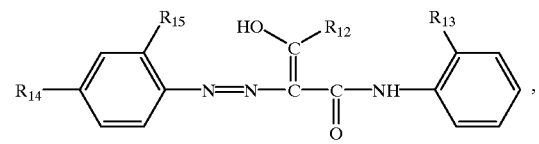   (3)

in which $R_{12}$ is $C_1$–$C_4$alkyl, $R_{13}$ is hydrogen, halogen, $C_1$–$C_4$alkyl, $C_1$–$C_4$alkoxy, nitro, cyano or a radical X, $R_{14}$ is hydrogen, halogen, nitro, cyano or a radical X, $R_{15}$ is hydrogen, halogen, $C_1$–$C_4$alkyl, $C_1$–$C_4$alkoxy, nitro or cyano, the dye of the formula (3) being required to contain at least one radical X,

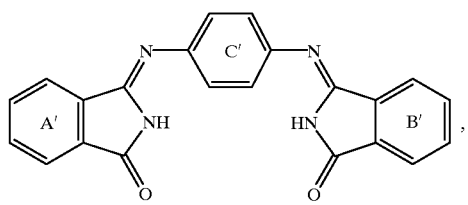   (4)

where the rings A' and B' are substituted one or more times by halogen and/or by a radical X, and the dye of the formula (4) being required to contain at least one radical X,

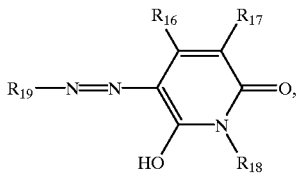   (5)

in which $R_{16}$ is $C_1$–$C_4$alkyl or a radical X, $R_{17}$ is hydrogen, cyano or carbamoyl, $R_{18}$ is hydrogen, $C_1$–$C_4$alkyl or a radical X, and $R_{19}$ is an anthraquinone radical or is a phenyl or naphthyl radical which is unsubstituted or substituted by $C_1$–$C_4$alkyl, $C_1$–$C_4$alkoxy, halogen, nitro, cyano, $CF_3$ or a radical X, the dye of the formula (5) being required to contain at least one radical X,

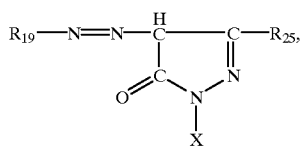  (6)

in which
- $R_{19}$ is an anthraquinone radical or is a phenyl or naphthyl radical which is unsubstituted or substituted by $C_1$–$C_4$alkyl, $C_1$–$C_4$alkoxy, nitro, cyano or a radical X, and
- $R_{25}$ is a $C_1$–$C_6$alkyl,

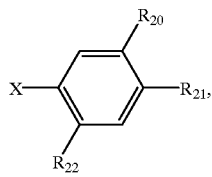  (7)

in which
- $R_{20}$ is hydrogen, halogen, cyano or nitro,
- $R_{21}$ is hydrogen or amino, and
- $R_{22}$ is hydrogen or halogen,

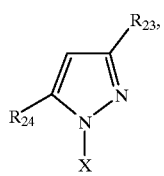  (8)

in which
- $R_{23}$ is hydrogen or $C_1$–$C_4$alkyl, and
- $R_{24}$ is hydrogen, hydroxy or amino, and

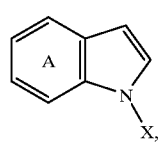  (9)

in which the ring A can be unsubstituted or substituted further.

X in the formula (1) is a hydrophilic polar radical, such as a carboxamido group, a sulfonamido group, it being possible for the amido radical in these groups to be mono- or disubstituted by hydroxy-$C_1$–($C_6$alkyl, or is an unsubstituted or hydroxyl-substituted $C_4$–$C_{12}$alkyl, the alkyl chain being interrupted one or more times by oxygen, carboxamido and/or sulfonamido, or in particular is a $C_1$–$C_6$alkyl which is substituted by one or more hydroxyl groups.

n in the formula (1) is 1, 2 or 3, with $(X)_n$ being one, two or three identical or different radicals X.

Preferably n=1.

In the process of the invention preference is given to the use of those dyes of the formula (1) which have a molecular weight<than 550.

In the process of the invention, particular preference is given to dyes of the formula

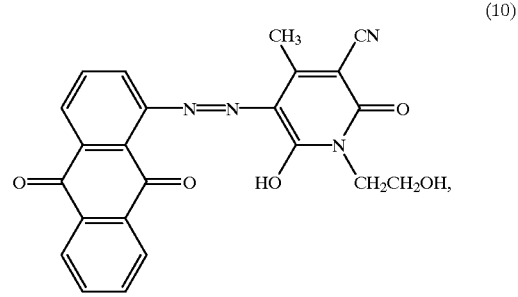  (10)

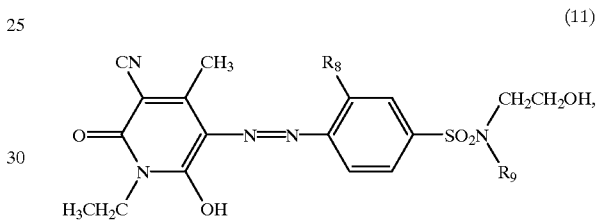  (11)

in which
$R_8$ is hydrogen, methoxy, halogen, nitro or $CF_3$ and $R_9$ is hydrogen, methyl, ethyl or hydroxyethyl,

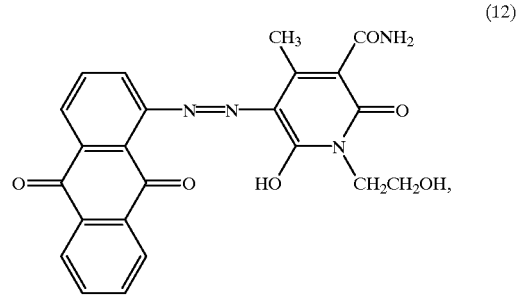  (12)

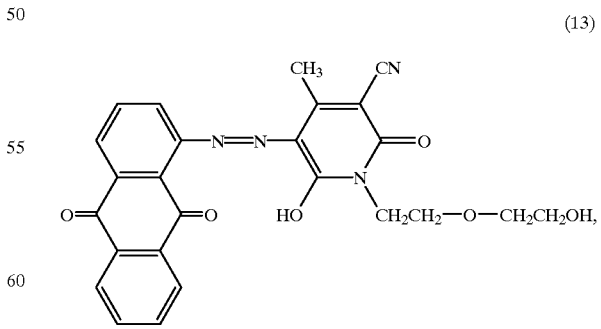  (13)

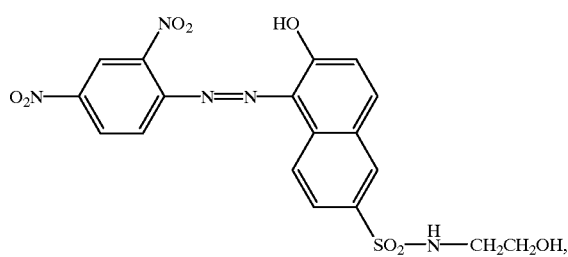
(14)
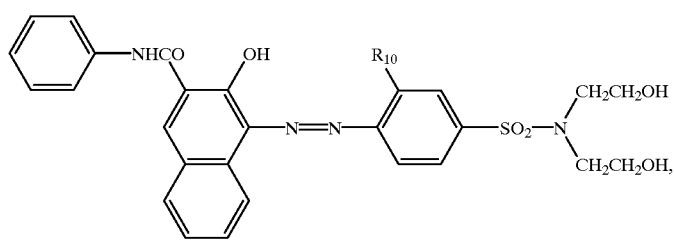
(15)
in which
R₁₀ is hydrogen, methoxy, chlorine or nitro,
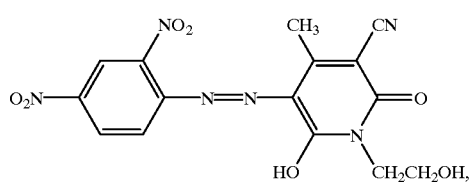
(16)
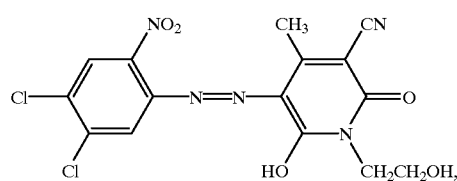
(17)
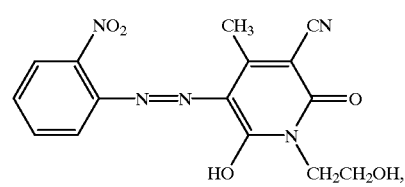
(18)
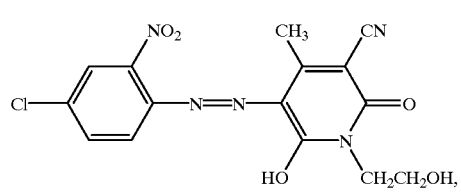
(19)
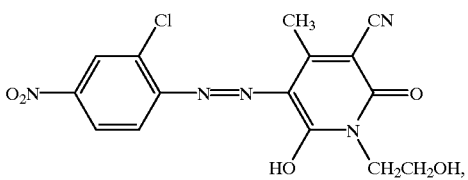
(20)
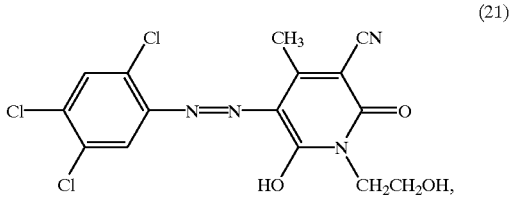
(21)
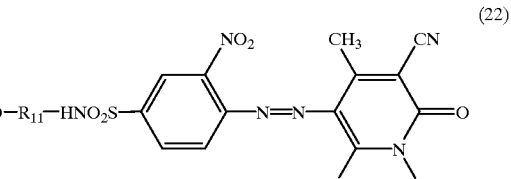
(22)
in which
R₁₁ is $C_{1-C_6}$alkyl,
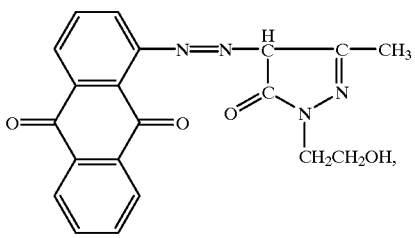
(23)

(24)
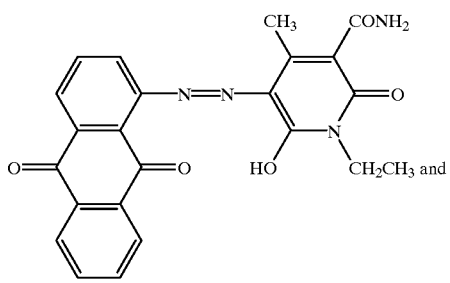
and

(25)
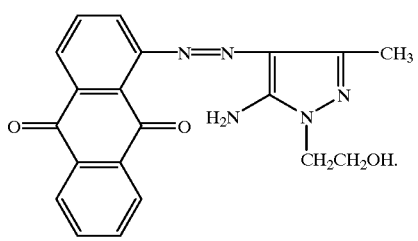

In the process of the invention, very particular preference is given to the dyes of the formulae (10), (11), (12) and (22).

The present invention additionally provides the dyes of the formula

(26)
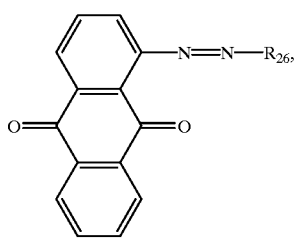

in which $R_{26}$ is a radical of the formula (5a)
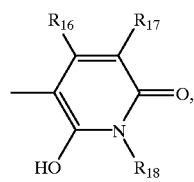

(6a)
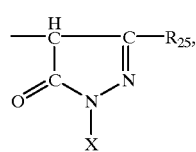

(27)
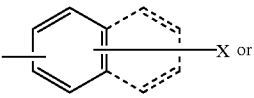

(8a)
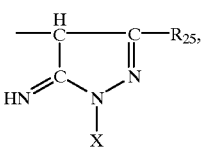

in which $R_{16}$, $R_{17}$, $R_{18}$, and $R_{25}$ are as defined under the formulae (5) and (6), X is a hydrophilic polar radical, and the phenyl or naphthyl radical in formula (27) is unsubstituted or substituted by halogen, cyano or nitro, the dyes of the formula (26) being required to contain at least one radical X.

The preparation of the abovementioned dyes of the formula (26) takes place by commonly known methods, by diazotizing a compound of the formula

(28)
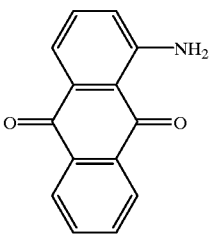

and coupling the product to a coupling component of the formula (5a), (6a), (27) or (8a). The resultant dye is isolated, washed and dried.

By proceeding analogously it is also possible to prepare the other above-listed monoazo dyes used in accordance with the invention.

Examples of suitable pigment dye binders for the process of the invention are acrylic polymers, such as poly(meth) acrylates, poly(meth)acrylamide or the copolymers of (meth)acrylates or (meth)acrylamide with appropriate comonomers, such as maleic, fumaric, itaconic, mesaconic, citraconic, vinylacetic, vinyloxyacetic, vinylpropionic, crotonic, aconitic, allylacetic, allyloxyacetic, allylmalonic, 2-acrylamido-2-methylpropanesulfonic, glutaconic or allylsuccinic acid, or with esters of these acids, N-vinylpyrrolidone, N-vinylformamide, N-vinylacetamide, (meth)acrolein, N-vinyl-N-methylacetamide, vinylcaprolactam, styrene derivatives or vinylphosphonic acid; polyamide derivatives; synthetic resin dispersions; vinyl-based copolymers; diamide-aldehyde precondensates; copolymers comprising N-vinyllactam, or butadiene-based polymers.

Particularly suitable comonomers are the esters of the abovementioned acids with $C_1$–$C_6$ alcohols, such as methyl, ethyl, isopropyl or butyl alcohol.

The dyes of the formula (1) are judiciously employed in dispersed form in the dye liquor or in the print paste.

In this case the dyes are advantageously milled with the dispersion medium so as to give a dye particle size of 0.05–1.0 μm.

In order to prepare the dye dispersion it is possible to use the customary dispersants, preferably nonionic dispersants.

Particularly suitable nonionic dispersants are compounds selected from the group of (ca) alkylene oxide adducts of the formula (29)

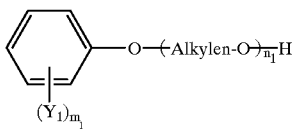

in which $Y_1$ is $C_1$–$C_{12}$alkyl, aryl or aralkyl,

"Alkylen" is the ethylene radical or propylene radical and $m_1$ is from 1 to 4 and $n_1$ is from 4 to 50, (cb) alkylene oxide adducts with (cba) saturated or unsaturated 1–6-hydric aliphatic alcohols, (cbb) fatty acids, (cbc) fatty amines, (cbd) fatty amides, (cbe) diamines, (cbf) sorbitan esters, (cc) alkylene oxide condensation products (block polymers), (cd) polymers of vinylpyrrolidone, vinyl acetate or vinyl alcohol, and (ce) copolymers of terpolymers of vinylpyrrolidone with vinyl acetate and/or vinyl alcohol.

Highly suitable components (ca) are polyadducts of from 4 to 40 mol of ethylene oxide with 1 mol of a phenol which has at least one $C_4$–$C_{12}$alkyl group, a phenyl group, a tolyl group, an α-tolylethyl group, a benzyl group, an α-methylbenzyl group or an α,α-dimethylbenzyl group, such as butylphenol, tributylphenol, octylphenol, nonylphenol, dinonylphenol, o-phenylphenol, benzylphenol, dibenzylphenol, α-tolylethylphenol, dibenzyl(nonyl)phenol, α-methylbenzylphenol, bis(α-methylbenzyl)phenol or tris(α-methylbenzyl)phenol, it being possible to use these adducts individually or in a mixture.

Of particular interest as component (ca) are adducts of from 6 to 30 mol of ethylene oxide with 1 mol of 4-nonylphenol, with 1 mol of dinonylphenol or, in particular, with 1 mol of compounds which are prepared by adding from 1 to 3 mol of styrenes onto 1 mol of phenols.

The styrene adducts are prepared in a known manner, preferably in the presence of catalysts, such as sulfuric acid, p-toluenesulfonic acid or, in particular, zinc chloride. Suitable styrenes are judiciously styrene, α-methylstyrene or vinyltoluene (4-methylstyrene). Examples of the phenols are phenol, cresols or xylenols.

Very particular preference is given to ethylene oxide adducts of the formula (30)

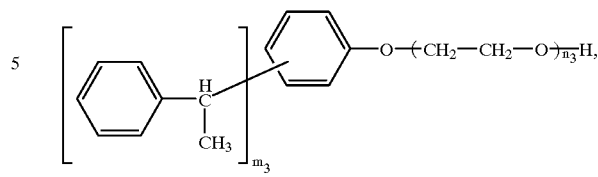

in which $m_3$ is from 1 to 3 and $n_3$ is from 8 to 30.

Likewise preferred are ethylene oxide adducts of the formula (31)

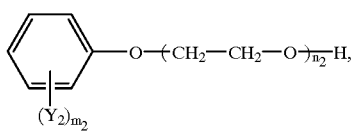

in which $Y_2$ is $C_4$–$C_{12}$alkyl, phenyl, tolyl, tolyl-$C_1$–$C_3$alkyl or phenyl-$C_1$–$C_3$alkyl, such as α-methyl or α,α-dimethylbenzyl, and $m_2$ is from 1 to 3 and $n_2$ is 4 to 40.

The nonionic component (cb) is advantageously an alkylene oxide adduct of from 1 to 100 mol of alkylene oxide, e.g. ethylene oxide and/or propylene oxide, with 1 mol of an aliphatic monoalcohol having at least 4 carbon atoms, of a 3- to 6-hydric aliphatic alcohol or of a phenol which is unsubstituted or substituted by alkyl, phenyl, (α-tolylethyl, benzyl, α-methylbenzyl or α,α-dimethylbenzyl (cba);

an alkylene oxide adduct of from 1 to 100, preferably from 2 to 80 mol of ethylene oxide—it being possible for individual ethylene oxide units to be replaced by substituted epoxides, such as styrene oxide and/or propylene oxide—with higher unsaturated or saturated monoalcohols (cba), fatty acids (cbb), fatty amines (cbc) or fatty amides (cbd) having 8 to 22 carbon atoms;

an alkylene oxide adduct, preferably an ethylene oxide-propylene oxide adduct, with ethylenediamine (cbe);

an ethoxylated sorbitan ester with long-chain ester groups, such as polyoxyethylene-sorbitan monolaurate having from 4 to 20 ethylene oxide units or polyoxyethylene-sorbitan trioleate having from 4 to 20 ethylene oxide units (cbf).

Preferred components (cc) are ethylene oxide adducts with polypropylene oxide (known as EO-PO block polymers) and propylene oxide adducts with polyethylene oxide (known as inverted EO-PO block polymers).

Particular preference is given to ethylene oxide-propylene oxide block polymers having molecular weights of the polypropylene oxide base of from 1700 to 4000 and having an ethylene oxide content in the overall molecule of 30–80%, especially 60–80%.

Where the dyes of the formula (1) are applied to the fibre material from a dyeing liquor, this is done, for example, by treating the fibre material with a dyeing liquor which comprises at least one dye of the formula (1) and at least one pigment dye binder and also, if desired, further auxiliaries, drying the dyed fibre material and subsequently fixing the dye by heat treatment.

The fibre material to be dyed is advantageously treated by a continuous process which is common in the textile industry, such as by a padding process.

The amounts in which the dyes of the formula (1) are used in the dyeing liquors can vary depending on the desired depth of colour; in general, amounts of from 0.01 to 15 per cent by weight, in particular from 0.1 to 10 per cent by weight of the dyes of the formula (1), based on the weight of the goods to be dyed, have been found advantageous.

In addition to the dyes of the formula (1) and the pigment dye binders, the dyeing liquors can comprise further generally customary additives, examples being crosslinker resins, such as water-soluble melamine, formaldehyde-melamine and formaldehyde-urea resins or precondensates, such as trimethylolmelamine, hexamethylolmelamine or dimethylourea, or water-soluble formaldehyde (pre) condensation products with formamide, thiourea, guanidine, cyanamide, dicyandiamide and/or water-soluble organic sulfonates such as the sodium salt of naphthalenesulfonic acid, or glyoxal urea derivatives, and especially N-methylol derivatives of nitrogen compounds, such as unmodified or etherified melamine-formaldehyde condensation products or N-methylolurea compounds, and also acid donors, such as aliphatic amine chlorides or magnesium chloride, aqueous solutions of inorganic salts, such as of alkali metal chlorides or alkali metal sulfates, alkali metal hydroxides, urea, thickeners, such as alginate thickeners, water-soluble cellulose alkyl ethers, and also levelling agents, antifoams and/or deaerating agents, penetration accelerants, migration inhibitors, fabric softeners and wetting agents.

The dyes of the formula (1) are preferably applied to the fibre material in a print paste by a pigment printing process.

The amounts in which the dyes of the formula (1) are used in the print pastes can vary depending on the desired depth of colour; in general, amounts of from 0.01 to 400 g, in particular from 0.5 to 300 g and, with very particular preference, from 1 to 200 g of the dyes per kg of print paste have been found advantageous.

In addition to the dyes of the formula (1) the print paste can also comprise one or more pigment dyes commonly used in the pigment printing technique.

The print paste here usually contains from 1 to 300 g, in particular from 50 to 200 g of the pigment dye binder per kg of print paste.

Advantageously, in addition to the dyes in the formula (1) and the pigment dye binder, the print paste additionally comprises thickeners, examples being those based on poly (meth)acrylic acids, poly(meth)acrylamides and co- and/or terpolymers thereof.

The thickener is present in the print paste preferably in an amount of from 0 to 100 g, in particular from 10 to 60 g and, with particular preference, from 10 to 40 g per kg of print paste.

The print paste may likewise comprise further auxiliaries which are customary in pigment printing, crosslinkers being a judicious example.

Examples of suitable crosslinkers are water-soluble melamine, formaldehyde-melamine, and formaldehyde-urea resins or precondensates, such as trimethylolmelamine, hexamethylol-melamine or dimethylourea, or water-soluble formaldehyde (pre)condensation products with formamide, thiourea, guanidine, cyanamide, dicyandiamide and/or water-soluble organic sulfonates, such as the sodium salt of naphthalenesulfonic acid, or glyoxal urea derivatives, such as the compound of the formula

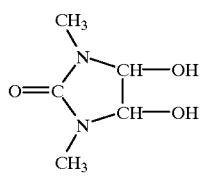

and especially N-methylol derivatives of nitrogen compounds, such as unmodified or etherified melamine-formaldehyde condensation products or N-methylolurea compounds.

Examples of the unmodified or etherified melamine-formaldehyde condensation products are the compounds of the formulae

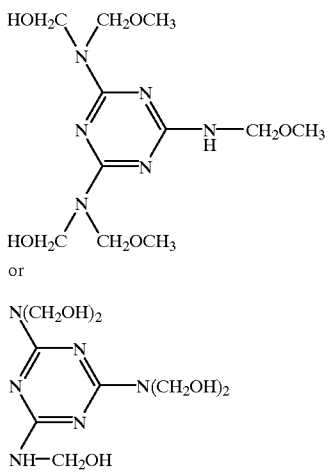

The unmodified or etherified N-methylolurea compounds comprise, for example, reaction products of formaldehyde with urea or urea derivatives, which products may have undergone subsequent etherification, examples of suitable urea derivatives being cyclic ethylene- or propyleneureas, which may also contain substitutents such as hydroxyl groups in the alkylene group, urones or unsubstituted or substituted trisazone resins.

Examples of appropriate N-methylolurea compounds are unmodified or modified N-methylol-hydroxyethyleneurea products, examples being the compounds of the formula

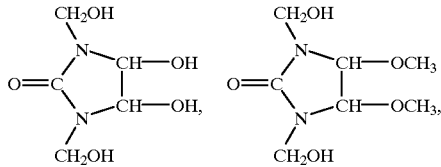

or methylolation products

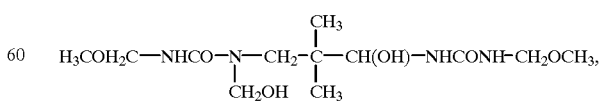

based on propyleneurea or ethyleneurea/melamine.

Preferred crosslinkers are unmodified or modified N-methylol-hydroxyethyleneurea compounds, methylolation products based on propyleneurea or ethyleneurea/ melamine and, in particular, unmodified or etherified melamine-formaldehyde condensation products. It is also possible to use mixtures of two or more different water-soluble crosslinkers, such as a mixture consisting of a non-esterified and of an only partly etherified melamine-formaldehyde condensation product.

If desired, the print paste may additionally comprise crosslinking catalysts, acid donors such as butyrolactone or sodium hydrogen phosphate, preservatives, sequestering agents, emulsifiers, water-insoluble solvents, oxidizing agents or deaerating agents.

Examples of suitable crosslinking catalysts for the process of the invention are all agents which are commonly used as catalysts for crease- and shrink-resistant finishing, as are known from Textilhilfsmittelkatalog [catalogue of textile auxiliaries] 1991, Konradin Verlag R. Kohlhammer, Leinfelden-Echterdingen 1991. Examples of suitable crosslinking catalysts are inorganic acids, such as phosphoric acid; Lewis acids, such as zinc chloride, zirconium oxychloride, $NaBF_4$, $AlCl_3$, $MgCl_2$; ammonium salts, such as ammonium sulfate, ammonium chloride; or hydrohalides, especially hydrochlorides of organic amines, such as $CH_3$—$CH_2$—$CH_2$—$NH$—$CH_3$. HCl.

Preference is given to the use of ammonium salts or magnesium-containing Lewis acids, and, in particular, of ammonium chloride or magnesium chloride.

Particularly suitable preservatives are formaldehyde donor agents, such as paraformaldehye and trioxane, especially aqueous formaldehyde solutions with a concentration of from about 30 to 40 per cent by weight; examples of suitable sequestering agents are sodium nitrilotriacetate, sodium ethylenediaminetetraacetate, especially sodium polymetaphosphate and, in particular, sodium hexametaphosphate; particularly suitable emulsifiers are adducts of an alkylene oxide and a fatty alcohol, especially an adduct of oleyl alcohol and ethylene oxide; suitable water-insoluble solvents are high-boiling saturated hydrocarbons, especially paraffins with a boiling range from about 160 to 210° C. (known as painter's and varnish maker's naphthas); examples of suitable oxidizing agents are an aromatic nitro compound, especially an aromatic mono- or dinitrocarboxylic acid or -sulfonic acid which may be present in the form of an alkylene oxide adduct, especially a nitrobenzene-sulfonic acid; and examples of suitable deaerating agents are high-boiling solvents, especially turpentine oils, higher alcohols, preferably $C_8$ to $C_{10}$ alcohols, terpene alcohols or deaerating agents based on mineral oils and/or silicone oils, especially commercial formulations of from about 15 to 25 per cent by weight of a mineral oil and silicone oil mixture and from about 75 to 85 per cent by weight of a $C_8$ alcohol such as 2-ethyl-n-hexanol, for example.

In the course of the printing of the fibre material, the print paste is applied directly to the entire surface or certain areas of the fibre material, judiciously using printing machines of customary construction, examples being intaglio printing, rotary screen printing, roller printing and flat screen printing machines. Printing can also be carried out by the ink-jet printing technique.

After being printed, the fibre material is advantageously dried, preferably at temperatures up to 150°C., in particular from 80 to 120° C., and then subjected to a heat treatment process in order to complete the print and/or to fix the dye.

The heat treatment can be implemented by a hot pad-batch process, a thermosol process or, preferably, by a steaming process (HT fixing).

In the case of the steaming process, the printed fibre material is subjected to treatment in a steamer with possibly superheated steam, judiciously at a temperature of from 95 to 210° C., and advantageously at from 100 to 180° C. In the case of HT fixing, the printed fibre material is preferably treated at from 150 to 170° C. for from 2 to 5 minutes.

The finishing of the prints by the thermosol process can be carried out following or without initial drying, for example at a temperature of from 100 to 210° C. The thermosol treatment preferably takes place at a temperature of from 120 to 210° C., in particular from 140 to 180° C. Depending on the temperature, the thermosol treatment may last from 20 seconds to 5 minutes, preferably from 30 seconds to 4 minutes.

Thermosol treatment is usually conducted at from 190 to 210° C. for 1 to 2 minutes. Subsequent to the printing process, the printed fibre material is washed off in a customary manner in order to remove unfixed dye. For this purpose the fibre material is treated with water at, for example, from 40° C. to boiling temperature, it being possible to add, if desired, a soap or a synthetic detergent to the water.

The printing process of the invention is performed, for example, by applying to the fibre material a print paste which comprises at least one dye of the formula (1) and at least one pigment dye binder and also, if desired, further auxiliaries, drying the printed fibre material and subsequently fixing the print by means of heat treatment.

The dyeing liquor or print paste used in accordance with the invention can be applied to various kinds of fibre materials, such as wool, silk, cellulose, polyvinyl, polyacrylonitrile, polyamide, aramid, polypropylene, polyester or polyurethane.

Preference is given to polyester-containing and cellulosic fibre materials. Suitable polyester-containing fibre materials are those consisting completely or partly of polyester. Examples are cellulose ester fibres, such as secondary cellulose acetate fibres and cellulose triacetate fibres, and especially linear polyester fibres, which have also undergone acidic modification, and are obtained, for example, by condensing terephthalic acid with ethylene glycol, of isophthalic or terephthalic acid with 1,4-bis(hydroxymethyl)-cyclohexane, and also fibres made from copolymers of terephthalic and isophthalic acid with ethylene glycol. Further suitable materials are polyester-containing blends, i.e. mixtures of polyester with other fibres.

Suitable cellulosic fibre materials are those materials which consist completely or partly of cellulose. Examples are naturally occurring fibre materials, such as cotton, linen or hemp, regenerated fibre materials, such as viscose, polynosic or cupro. Also suitable are cellulosic fibre blend materials, i.e. mixtures of cellulose with other fibres, especially cotton/polyester fibre materials.

Predominantly, wovens, knits or webs of these fibres are used.

The dyeings or prints obtainable by the process of the invention have good all-round fastness properties; they possess, for example, good wet fastnesses, such as good wash, water, salt water, cross-dyeing and perspiration fastness, good chlorine fastness, rub fastness and fastness to pleating and dry heat setting, and are notable for high colour strength and brilliant shades. In particular, the dyeings or prints obtainable by the process of the invention feature very good light fastness, sublimation fastness and dry-cleaning fastness properties.

The examples which follow serve to illustrate the invention. Parts and percentages therein are by weight. The temperatures are given in degrees Celsius. Parts by weight relate to parts by volume as the gram relates to the cubic centimetre.

EXAMPLE 1

2.23 g of 1-aminoanthraquinone are stirred up in 20 ml of 100% acetic acid, and 1.7 ml of 40% nitrosylsulfuric acid are added dropwise at room temperature. After a brief reaction period, 1.94 g of the pyridone compound of the formula

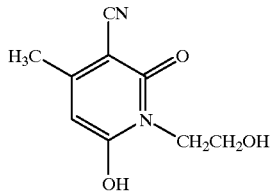
(32)

are introduced. Subsequently, the coupling is brought to completion by dropwise addition of saturated sodium acetate solution and the precipitated solid of the formula

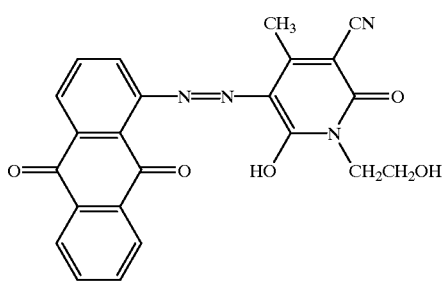
(10)

is isolated by filtration, washed with hot water and dried.

EXAMPLE 2

26 g of aniline-4-(bis-N,N-hydroxyethyl)sulfonamide are dissolved in 200 ml of water containing 25 ml of concentrated hydrochloric acid, cooled to 0° C. and diazotized with an aqueous solution of 6.9 g of sodium nitrite. The resulting diazo compound is neutralized with sodium acetate solution, and a solution of 18 g of the coupling component of the formula

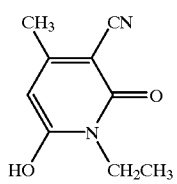
(33)

is added. The pH is raised to 5. The resulting dye of the formula

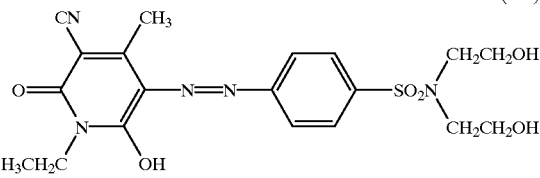
(11a)

is filtered, washed with water and dried.

EXAMPLE 3

Following the procedure described in Example 1 but using not the 1.94 g of the coupling component of the formula (32) but the stoichiometric amount of the coupling component of the formula

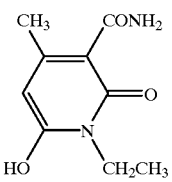
(34)

gives a dye powder of the formula

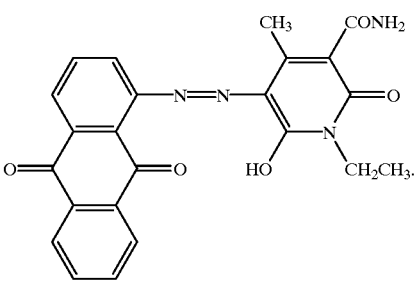
(24)

EXAMPLE 4

2.23 g of 1-aminoanthraquinone are stirred up in 20 ml of 100% acetic acid, and 1.7 ml of 40% nitrosylsulfuric acid are added dropwise at room temperature. After a brief period of reaction, 1.41 g of a compound of the formula

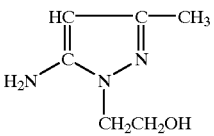
(35)

are introduced, and saturated sodium acetate solution is added dropwise in order to complete the coupling reaction.

The precipitated solid is filtered off, washed with hot water and dried. This gives a greenish yellow dye powder of the formula

(25)
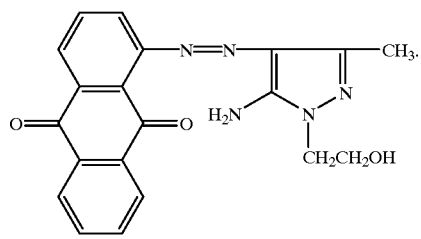
EXAMPLE 5
Following the procedures described in Example 1 but using not 2.23 g of 1-aminoanthraquinone but the stoichiometric amount of one of the compounds (A) listed in Table 1 and not 1.94 g of a coupling component of the formula (32) but the stoichiometric amount of one of the coupling components (B) listed in Table 1 gives the dyes of the formulae (12) to (23) indicated in Table 1.

TABLE 1
| Compound (A) | Coupling component (B) | Dye of the formula |
|---|---|---|
| 1-Aminoanthraquinone | 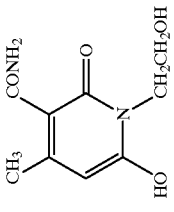 | 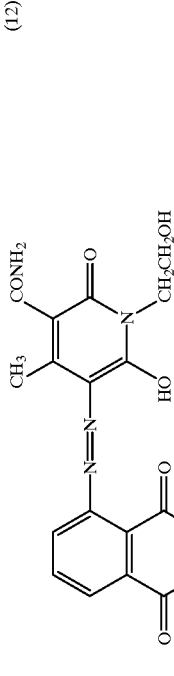 (12) |
| 1-Aminoanthraquinone | 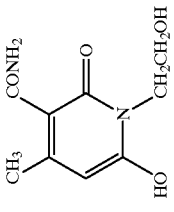 | 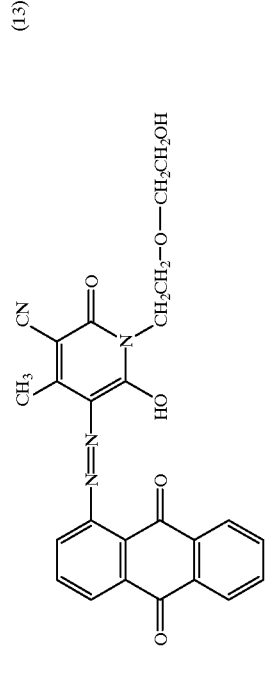 (13) |
| 2,4-Dinitroaniline | 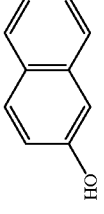 | 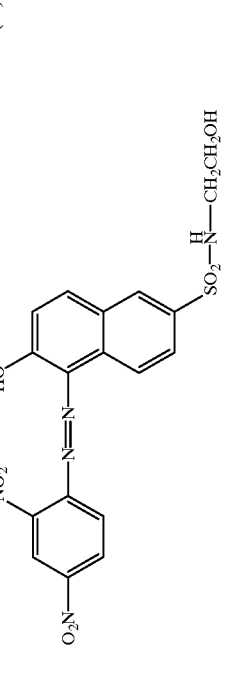 (14) |

TABLE 1-continued
| Compound (A) | Coupling component (B) | Dye of the formula | |
|---|---|---|---|
| Aniline-4-(bis-N,N-hydroxyethyl)sulfonamide | 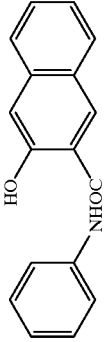 | 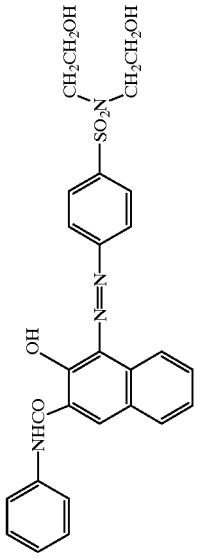 | (15a) |
| 2,4-Dinitroaniline | 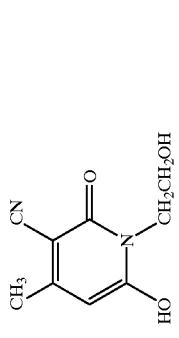 | 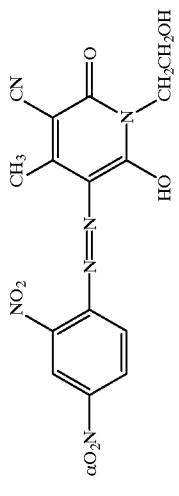 | (16) |
| 2-Nitro-4,5-dichloroaniline | 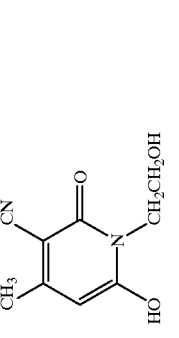 | 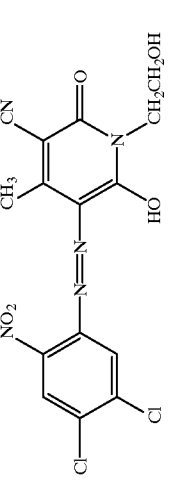 | (17) |
| 2-Nitroaniline | 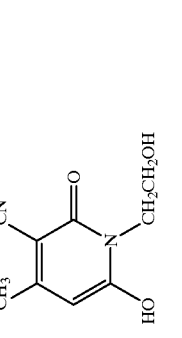 | 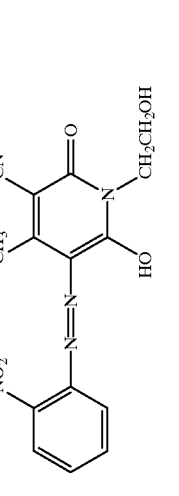 | (18) |
| 2-Nitro-4-chloroaniline | 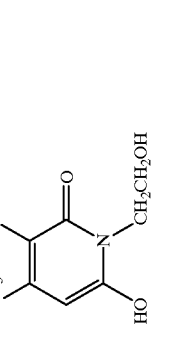 | 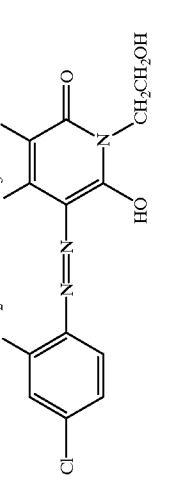 | (19) |

TABLE 1-continued
| Compound (A) | Coupling component (B) | Dye of the formula | |
|---|---|---|---|
| 2-Chloro-4-nitroaniline | 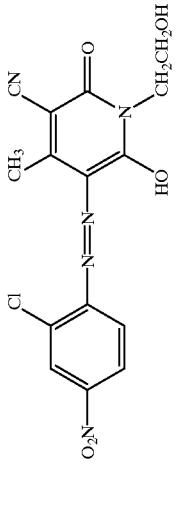 | 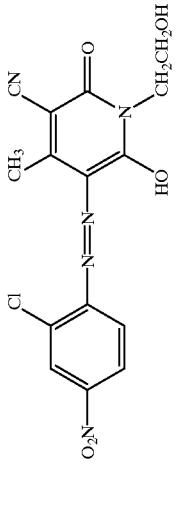 | (20) |
| 2,4,5-Trichloroaniline | 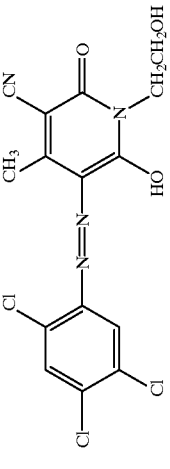 | 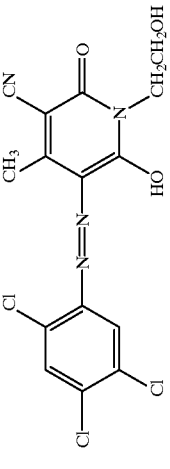 | (21) |
| 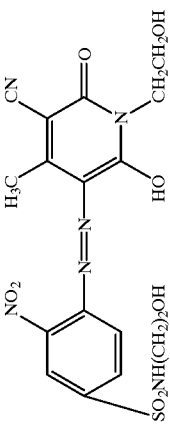 (with SO₂NH(CH₂)₂OH, NO₂, H₂N substituents) | 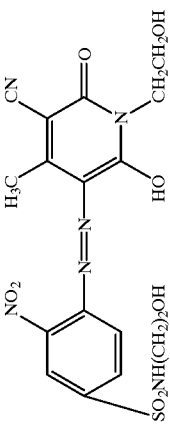 | 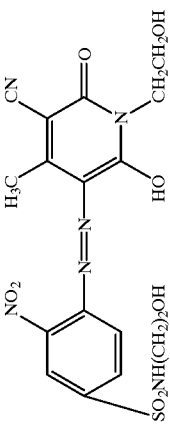 | (22a) |
| 1-Aminoanthraquinone | 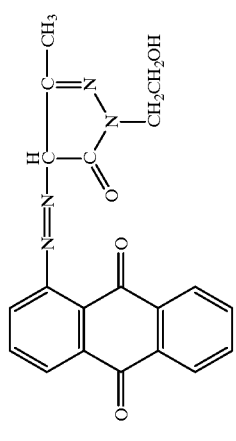 | 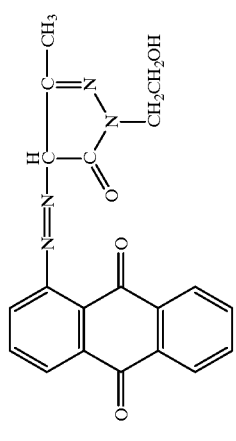 | (23) |

EXAMPLE 6

A cotton fabric is printed with a print paste comprising 30.6 g of a 21.5% aqueous, microdispersed formulation of the dye of the formula (10), 120 g of a commercial acrylate binder (®Alcoprint PBA), 5 g of a 30% aqueous ammonia solution, 3 g of a commercial wetting agent (®Lyoprint AP), and 16 g of an ammonium salt of a synthetic thickener based on polyacrylic acid per kg of print paste, and the resulting print is dried at 120° C. for 90 seconds and then fixed in a hot-air drier at 160° C. for 4 minutes.

This gives a golden yellow print with good light, sublimation and dry-cleaning fastness properties.

EXAMPLE 7

Following the procedure indicated in Example 6 but using not 30.6 g of a 21.5% aqueous, microdispersed formulation of the dye of the formula (10) but the same amount of the dye of the formula (11 a), of the formula (12) or of the formula (22a) likewise gives prints having good light, sublimation and dry-cleaning fastness properties.

EXAMPLE 8

Following the procedure indicated in Example 6, but using not a cotton fabric but a polyester fabric, likewise gives a golden yellow print having good light, sublimation and dry-cleaning fastness properties.

EXAMPLE 9

Following the procedure indicated in Example 6 but using not a cotton fabric but a polyester/cotton (67/33) blend fabric likewise gives a golden yellow print having good light, sublimation and dry-cleaning fastness properties.

EXAMPLE 10

A cotton fabric is padded (liquor pickup about 70%) with an aqueous liquor comprising 43 g/l of a 21.5% aqueous, microdispersed formulation of the dye of the formula

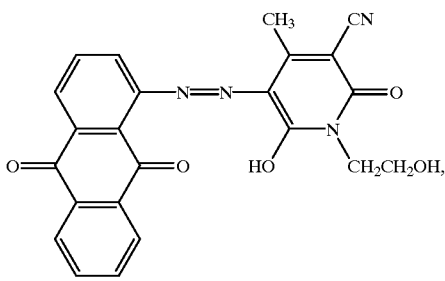

(10)

60 g/l of a commercial softener (®Avivan MS), 40 g/l of a commercial acrylate binder (®Dicrylan AM), 25 g/l of a commercial migration inhibitor (®rgapadol MP), 2 g/l of a commercial wetting agent (®Cibaflow Pad), and 20 g/l of polyethylene glycol PEG 400, dried at 120° C. for 90 seconds and then fixed in a hot-air drier at 160° C. for 90 seconds.

A golden yellow dyeing is obtained which has good light, sublimation and dry-cleaning fastness properties.

EXAMPLE 11

A cotton/polyester (50.50) blend fabric is padded (liquor pickup about 70%) with an aqueous liquor comprising 43 g/l of a 21.5% aqueous, microdispersed formulation of the dye of the formula

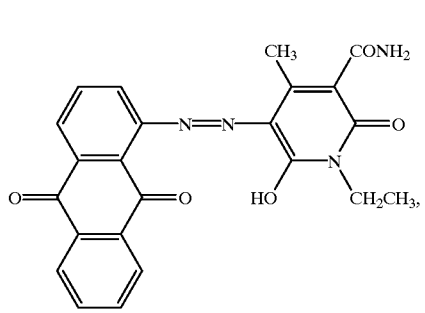

(24)

60 g/l of a commercial softener (®Avivan MS), 40 g/l of a commercial acrylate binder (®Dicrylan AM), 25 g/l of a commercial migration inhibitor (®Irgapadol MP), 2 g/l of a commercial wetting agent (®Cibaflow Pad), 20 g/l of polyethylene glycol PEG 400, 5 g/l of a commercial crosslinker resin formulation (®Knittex FEL), and 2 g/l of magnesium chloride hexahydrate, dried at 120° C. for 90 seconds and then fixed in a hot-air drier at 170° C. for 60 seconds.

A yellow dyeing is obtained which has good light, sublimation and dry-cleaning fastness properties.

What is claimed is:

1. A process for dyeing or printing fibre material by the pigment dyeing or pigment printing process, which comprises applying to the fibre material, and subsequently fixing, a dyeing liquor or a print paste comprising at least one dye having a molecular weight<than 550 of the formula

in which

D is a radical of an insoluble organic dye of the phthalocyanine, perinone, indigoid, thioindigoid, dioxazine, diketopyrrolopyrrole, isoindolinone, perylene, quinacridone, metal complex, monoazo, disazo, trisazo or anthraquinone series, X is a carboxamido group, a sulfonamido group, an unsubstituted or hydroxy substituted $C_4$–$C_{12}$alkyl, the alkyl chain being interrupted one or more times by oxygen, carboxamido and/or sulfonamido, or a $C_1$–$C_6$alkyl which is substituted by one or more hydroxyl groups, and n is 1, 2 or 3, and at least one pigment dye binder, and also, optionally, further auxiliaries.

2. A process according to claim 1, wherein the fibre material is printed by the pigment printing process with a print paste comprising at least one dye of the formula (1) and at least one dye pigment binder and, if desired, further auxiliaries, and is then fixed.

3. A process according to claim 1, wherein D is a radical of an insoluble organic dye of the monoazo, disazo, trisazo or anthraquinone series.

4. A process according to claim 1, wherein X is a carboxamido group, a sulfonamido group or an unsubstituted or hydroxyl-substituted $C_4$–$C_{12}$alkyl, the alkyl chain being interrupted one or more times by oxygen, carboxamido and/or sulfonamido.

5. A process according to claim 1, wherein the amido radical in the carboxamido group and/or in the sulfamido group is mono- or disubstituted by hydroxy-$C_1$–$C_6$alkyl.

6. A process according to claim 1, wherein X is a $C_1$–$C_6$alkyl which is substituted by one or more hydroxyl groups.

7. A process according to claim 2, wherein the print paste used additionally comprises one or more pigment dyes.

8. A process according to claim 1, wherein the print paste used additionally comprises a thickener.

9. A process according to claim 1, wherein the print paste used additionally comprises a crosslinker.

10. A process according to claim 1, wherein the print paste used additionally comprises a crosslinking catalyst.

11. A process according to claim 1, wherein the print paste used additionally comprises one or more pigment dyes.

12. A process according to claim 2, wherein the print paste used additionally comprises a thickener.

13. A process according to claim 2, wherein the print paste used additionally comprises a crosslinker.

14. A process according to claim 2, wherein the print paste used additionally comprises a crosslinking catalyst.

* * * * *